United States Patent
Zia et al.

(10) Patent No.: US 7,470,624 B2
(45) Date of Patent: Dec. 30, 2008

(54) INTEGRATED ASSIST FEATURES FOR EPITAXIAL GROWTH BULK/SOI HYBRID TILES WITH COMPENSATION

(75) Inventors: Omar Zia, Austin, TX (US); Nigel Cave, Austin, TX (US); Venkat Kolagunta, Austin, TX (US); Ruiqi Tian, Austin, TX (US); Edward O. Travis, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 10 days.

(21) Appl. No.: 11/651,253

(22) Filed: Jan. 8, 2007

(65) Prior Publication Data

US 2008/0168418 A1 Jul. 10, 2008

(51) Int. Cl.
*H01L 21/302* (2006.01)

(52) U.S. Cl. .................... 438/692; 438/693

(58) Field of Classification Search ................ 438/689, 438/690, 691, 692, 693
See application file for complete search history.

(56) References Cited

U.S. PATENT DOCUMENTS

| | | | |
|---|---|---|---|
| 5,278,105 A | 1/1994 | Eden et al. | |
| 6,093,631 A | 7/2000 | Jaso et al. | |
| 6,242,324 B1 * | 6/2001 | Kub et al. | 438/455 |
| 6,323,113 B1 | 11/2001 | Gabriel et al. | |
| 6,593,226 B2 | 7/2003 | Travis et al. | |
| 6,611,045 B2 | 8/2003 | Travis et al. | |
| 6,614,062 B2 * | 9/2003 | Chheda et al. | 257/206 |
| 6,764,919 B2 | 7/2004 | Yu et al. | |
| 6,905,967 B1 | 6/2005 | Tian et al. | |
| 6,948,146 B2 | 9/2005 | Allen et al. | |
| 7,103,863 B2 | 9/2006 | Riepe et al. | |
| 7,125,785 B2 * | 10/2006 | Cohen et al. | 438/481 |
| 2002/0065023 A1 * | 5/2002 | Kwok | 451/37 |
| 2005/0097490 A1 | 5/2005 | Travis et al. | |
| 2005/0133832 A1 | 6/2005 | Murthy et al. | |
| 2006/0228850 A1 * | 10/2006 | Tsai et al. | 438/219 |
| 2007/0015346 A1 * | 1/2007 | Cohen et al. | 438/481 |
| 2007/0224795 A1 * | 9/2007 | Chen et al. | 438/597 |

\* cited by examiner

*Primary Examiner*—Kin-Chan Chen
(74) *Attorney, Agent, or Firm*—John A. Fortkort; Fortkort & Houston P.C.

(57) ABSTRACT

A method for making a semiconductor device is provided which comprises (a) creating a first data set (301) which defines a first set of tiles (303) for a trench chemical mechanical polishing (CMP) process; (b) deriving a first trench CMP mask set (307) and at least one epitaxial growth mask set (321, 331) from the first data set, wherein the at least one epitaxial growth mask set corresponds to tiles (305, 307) present on first (203) and second (207) distinct semiconductor surfaces; (c) reconfiguring the first trench CMP mask set to account for the at least one epitaxial growth mask set, thereby defining a second trench CMP mask set (308), wherein the second trench CMP mask set defines a set of trench CMP tiles; and (d) using the second trench CMP mask set to make a semiconductor device.

20 Claims, 6 Drawing Sheets

INTEGRATED ASSIST FEATURES FOR EPITAXIAL GROWTH BULK/SOI HYBRID TILES WITH COMPENSATION

FIELD OF THE DISCLOSURE

The present application relates generally to semiconductor fabrication processes and, more particularly, to semiconductor fabrication processes in which structural tiles are selectively incorporated into one or more layers of the device to improve process uniformity.

BACKGROUND OF THE DISCLOSURE

The characteristics of certain semiconductor fabrication processes are found to vary considerably from one device to another. For example, the rate and uniformity of chemical mechanical planarization (CMP) techniques employed in conjunction with shallow trench isolation (STI) processes varies considerably as a function of feature pattern density. As a result, the application of such trench CMP processes to substrates that contain active regions of different population densities can give rise to significant and undesirable non-uniformities in topography.

This problem is sometimes addressed through the incorporation of dummy features or "tiles" into less populated active regions of a semiconductor device so as to even out the pattern density between the two regions, thereby achieving greater process uniformity in the trench CMP process. Such dummy features or tiles are typically placed in the "white space" between active device features, and are thus independent of the circuit design of the semiconductor device.

The characteristics of epitaxial growth processes are also found to vary significantly with pattern density. For example, when epitaxial growth processes are used to form silicon germanium alloy films on CMOS substrates, the growth rate, quality, composition and thickness of the resulting films are all highly sensitive to pattern density.

Some attempts have been made in the art to compensate for the effect of pattern density on epitaxial growth. For example, in one known approach, a fraction of the active tiles used to control topographical uniformity in the chemical mechanical polishing (CMP) attendant to shallow trench isolation (STI) are reused for density matching in subsequent epitaxial growth processes. However, this approach is found to produce suboptimal results in terms of compensating for differences in pattern densities during epitaxy.

There is thus a need in the art for a process which overcomes the aforementioned infirmities. In particular, there is a need in the art for a tiling scheme which addresses the needs of both trench CMP and epitaxy. These and other needs may be addressed with the methodologies and devices described herein.

DETAILED DESCRIPTION

Figure 1:
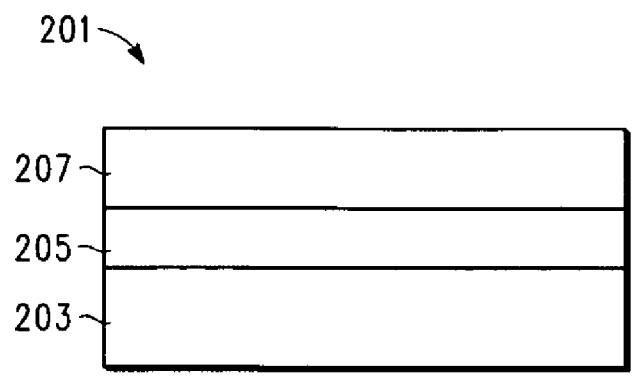
FIG. 1 is an illustration of a step in a semiconductor fabrication process in accordance with the teachings herein.

In one aspect, a method for making a semiconductor device is provided which comprises (a) creating a first data set which defines a set of tiles for a trench chemical mechanical polishing (CMP) process; (b) deriving a first trench CMP mask set and at least one epitaxial growth mask set from the first data set, wherein the at least one epitaxial growth mask set defines epitaxial growth tiles present on first and second distinct semiconductor surfaces; (c) reconfiguring the first trench CMP mask set to account for the at least one epitaxial growth mask set, thereby deriving a reconfigured trench CMP mask set which defines a set of reconfigured trench CMP tiles; and (d) using the reconfigured trench CMP mask set to make a semiconductor device.

In another aspect, a method for making a semiconductor device is provided which comprises (a) creating a first data set which defines a first set of tiles optimized for a trench CMP process; (b) deriving a first trench CMP mask set and at least one epitaxial growth mask set from the first data set, wherein the at least one epitaxial growth mask set is derived from the first data set by removing first and second subsets of the tiles defined by the first data set and incorporating the first and second subsets of tiles into the at least one epitaxial growth mask set; and (c) re-optimizing the first trench CMP mask by adjusting the dimensions of some of the tiles defined therein.

It has now been found that the aforementioned needs may be met through the provision of a tiling strategy based on a first data set which defines a set of tiles for a trench chemical mechanical polishing (CMP) process. A first trench CMP mask set is derived from the data set and includes a first set of tiles which have been optimized for a chemical mechanical polishing (CMP) process. At least one epitaxial mask set, which includes first and second sets of epitaxial tiles for an epitaxial growth process, is also derived from the data set by removing first and second subsets of tiles from the first mask set and incorporating those tiles into the at least one epitaxial mask sets. In some embodiments, the reallocated tiles may also be reoriented, or their dimensions may be adjusted.

After the at least one epitaxial mask set is formed, the first trench CMP mask set may then be re-optimized or otherwise reconfigured to account for the loss of tiles and/or the presence or configuration of adjacent epitaxial tiles. This may be accomplished, for example, by adjusting the dimensions of those tiles in the first mask set which are adjacent to tiles of the at least one epitaxial mask set so as to achieve or restore a desired feature density.

The use of at least one epitaxial mask set (and multiple sets of epitaxial tiles) in the methodologies described herein permits the epitaxial tiles to be effectively optimized for the epitaxial process, despite being selected from a mask set originally optimized for trench CMP. For example, in a preferred embodiment, the at least one epitaxial mask set is used in conjunction with an SOI wafer to define a semiconductor device. The first set of epitaxial tiles are then formed in the SOI layer, and the second set of epitaxial tiles are formed in the substrate. In a preferred embodiment, the first and second sets of epitaxial tiles are formed by a single epitaxial mask, though in some embodiments, the first set of epitaxial tiles may be defined by a first epitaxial mask, and the second set of epitaxial tiles may be formed by a second epitaxial mask. Since the SOI tiles are at, or near, the surface of the device and the substrate is buried, the SOI tiles may be selectively utilized wherever a local increase in silicon overburden is required to improve CMP.

Unlike approaches in which a fraction of the active tiles used for trench CMP are merely reused for density matching in epitaxy, the approach described herein permits the needs of trench CMP to be decoupled from those of epitaxial growth processes. For example, such an approach allows the epitaxial tiles to be oriented so as to favor certain desired growth rates and facets, thereby allowing silicon overburden and epitaxial CMP characteristics to be tailored independently of the needs imposed by trench CMP. Consequently, this approach allows both global and local pattern density effects to be adequately compensated for.

The methodology disclosed herein may be further appreciated with respect to FIGS. 1-8, which disclose a first particular, non-limiting embodiment of a process in accordance with the teachings herein. With reference to FIG. 1, a structure 201 is provided which comprises a substrate 203 which preferably comprises (110) silicon and upon which is disposed a buried oxide (BOX) layer 205 and an SOI layer 207, the later of which preferably comprises (100) silicon.

Figure 2:
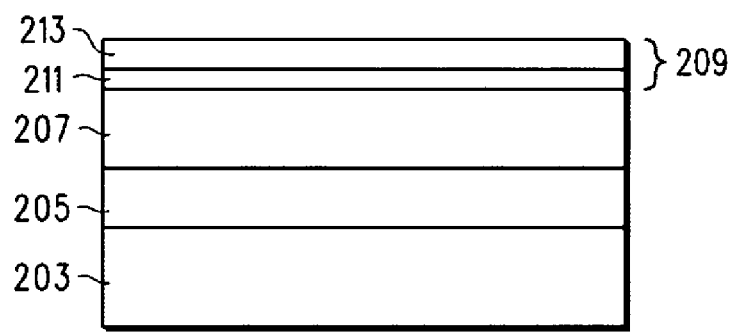
FIG. 2 is an illustration of a step in a semiconductor fabrication process in accordance with the teachings herein.
Figure 3:
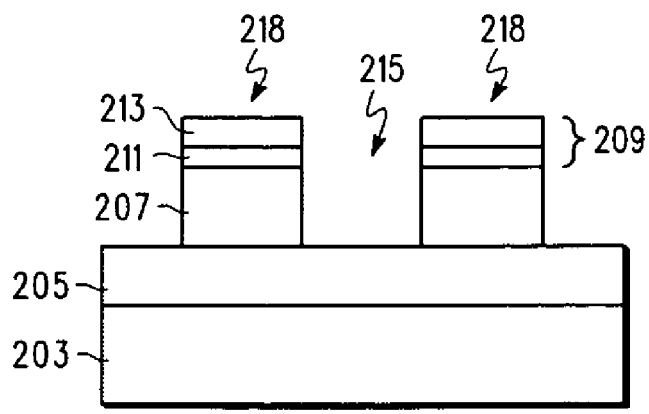
FIG. 3 is an illustration of a step in a semiconductor fabrication process in accordance with the teachings herein.

As shown in FIG. 2, a hard mask 209 is then formed over the structure. The hard mask 209 comprises a layer of oxide 211 over which is deposited a layer of nitride 213. As shown in FIG. 3, the hard mask 209 is then patterned to expose a portion of the underlying SOI layer 207, and the exposed portion of the SOI layer 207 is removed by etching to define a first trench 215 therein which extends to the BOX layer 205. The BOX layer 205 may be used as an etch stop in this process. In inactive regions of the device, the resulting structures 218 formed by the etch process are the CMP tiles.

Figure 4:
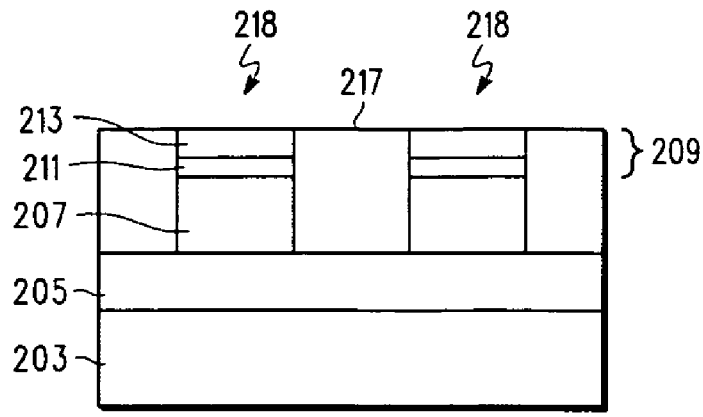
FIG. 4 is an illustration of a step in a semiconductor fabrication process in accordance with the teachings herein.

Referring now to FIG. 4, the first trench 215 is then backfilled with a suitable oxide 217. This oxide deposition is preferably followed by CMP so that the oxide 217 is coplanar with the hard mask 209.

Figure 5:
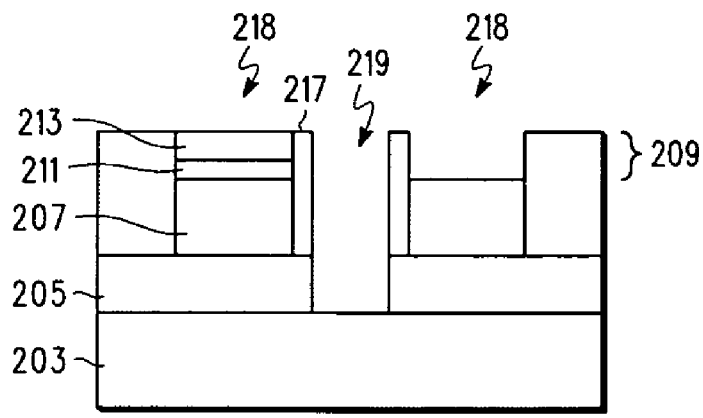
FIG. 5 is an illustration of a step in a semiconductor fabrication process in accordance with the teachings herein.

Next, as shown in FIG. 5, a second trench 219 is created within the backfilled oxide 217 which exposes a portion of the substrate 203. A suitable oxide etch may be used for this purpose. In inactive regions of the device, the portions of the substrate exposed by the second trench 219 form a first type of epitaxial tile. The hard mask 209 is also removed in selected locations to expose a portion of the SOI layer 207. This may be accomplished, for example, through the use of a suitable photo mask in conjunction with an aqueous HF etch. Alternatively, the hard mask above the portions of the SOI layer that are to be selectively exposed can be stripped simultaneously with the formation of the bulk SOI etch using a "combined" mask set with a suitable Boolean algorithm. The exposed portions 218 of the SOI layer 207 form a second type of epitaxial tile.

Figure 6:
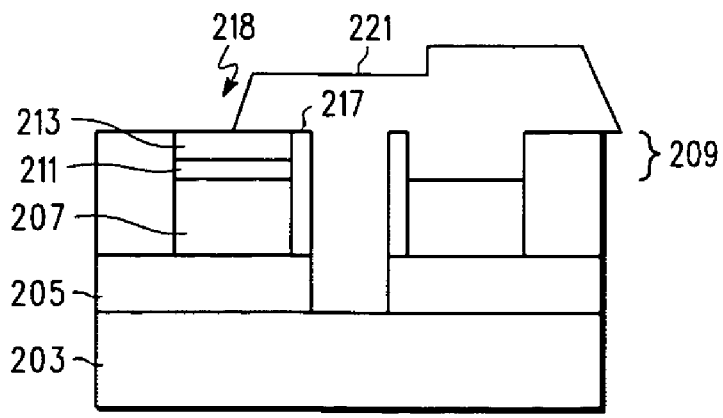
FIG. 6 is an illustration of a step in a semiconductor fabrication process in accordance with the teachings herein.

As shown in FIG. 6, the second trench 219 (see FIG. 5) is then filled with epitaxial material 221 through epitaxial growth of the (110) substrate 203. The epitaxial material 221 is grown to a height above the hard mask 209. This height is referred to as the silicon overburden. Since a portion 218 of the SOI layer 207 is also exposed, the epitaxial material grows simultaneously from this surface as well. Though not preferred, embodiments are also contemplated in which epitaxial growth is made to occur in succession from the bulk and SOI surfaces, as through the use of appropriate masking techniques that open these surfaces to epitaxial growth in successive processing steps.

Moreover, since the exposed portion 218 of the SOI layer 207 is closer to the surface of the structure, it contributes a somewhat larger silicon overburden during epitaxial growth as compared to the portion of the substrate 203 exposed by the trench 219. Hence, the number and location of the first and second types of epitaxial tiles may be chosen to tailor the amount of silicon overburden so as to optimize the epitaxial growth process and, in particular, the uniformity thereof.

During epitaxial growth, the backfilled oxide 217 prevents lateral growth of the SOI layer 207 within the trench. In addition to ensuring the monocrystallinity of the resulting epitaxial growth, the backfilled oxide 217 also prevents the formation of stress fracture regions within the trench which might otherwise form along intersections of the crystal propagation fronts. Such stress fracture regions may be formed in the silicon overburden; however, their presence there is more acceptable, since the silicon overburden is removed by CMP in subsequent processing.

Figure 7:
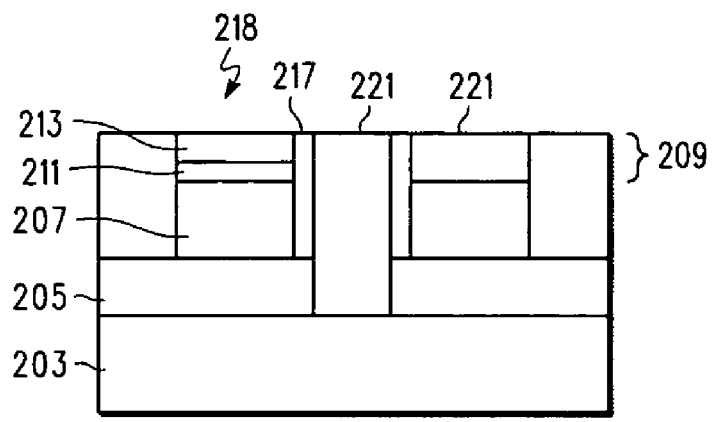
FIG. 7 is an illustration of a step in a semiconductor fabrication process in accordance with the teachings herein.
Figure 8:
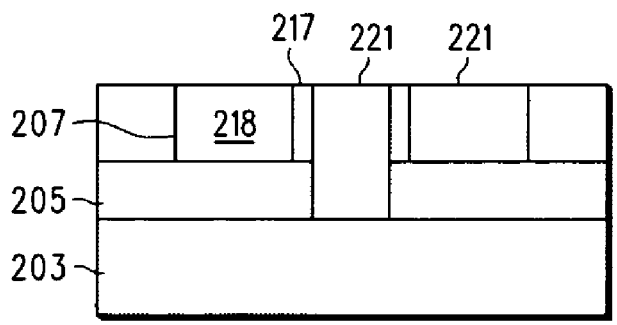
FIG. 8 is an illustration of a step in a semiconductor fabrication process in accordance with the teachings herein.

Referring now to FIG. 7, the epitaxial material 221 is subjected to CMP to planarize it with respect to the hard mask 209. The hard mask 209 is then stripped, and a portion of the exposed epitaxial material 221 is removed through a suitable etching process so that it is essentially planar with respect to the SOI silicon layer 207 as shown in FIG. 8. Such an etching process may comprise wet and/or dry etching or a combination of an oxidation and etching process.

Figure 9:
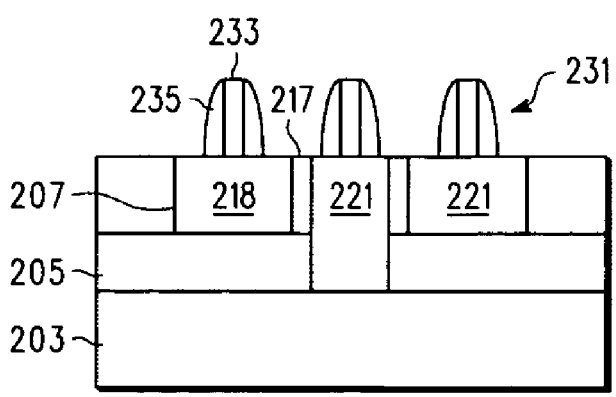
FIG. 9 is an illustration of a step in a semiconductor fabrication process in accordance with the teachings herein.

As shown in FIG. 9, the structure is then subjected to various processes typical of CMOS fabrication. These processes typically include the formation of gate structures 231, each of which will typically include a gate electrode 233 and spacer structures 235.

It will be appreciated that various modifications may be made to the foregoing process without departing from the scope of the teachings herein. For example, the hard masks used in the methodologies described herein may have various constructions and chemical compositions, and are not limited to oxide/nitride masks of the type depicted in the foregoing processes. In some embodiments, a suitable photo resist may be used in place of these hard masks. Moreover, the device may contain additional, or fewer, layers than those shown.

It will also be appreciated that the SOI silicon layer 207 and/or the silicon substrate 203 may be replaced in the foregoing process with germanium (Ge) or with silicon germanium (SiGe) alloys. Moreover, while it is preferred that the SOI silicon layer 207 has a (100) crystal orientation and that the substrate 203 has a (110) crystal orientation, the methodologies disclosed herein are not limited to any particular crystal orientation of either of these layers.

FIGS. 10-19 illustrate a particular, non-limiting embodiment of a tiling algorithm in accordance with the teachings herein. The algorithm of FIGS. 10-19 essentially comprises two phases. In the first phase, depicted in FIGS. 10-14, a first set of initial trench CMP tiles are defined, and are preferably optimized for STI CMP. First and second subsets of the trench CMP tiles are then reallocated for use as epitaxial tiles. The first subset includes a first type of epitaxial tile formed by exposing portions of a semiconductor substrate, and the second subset includes a second type of epitaxial tile formed by exposing portions of the SOI layer. The first and second subsets of tiles, which are preferably incorporated into a single epitaxial mask but which may also be incorporated into first and second epitaxial masks, may be chosen to improve or optimize epitaxy, or may be reconfigured or re-oriented to improve or to optimize epitaxy. In the second phase of the algorithm, depicted in FIGS. 15-19, the trench CMP tiles are then reconfigured or re-optimized to account for the reallocation of active tiles. In some embodiments, the first and second epitaxial tiles may also be subsequently re-optimized or reconfigured.

Figure 10:
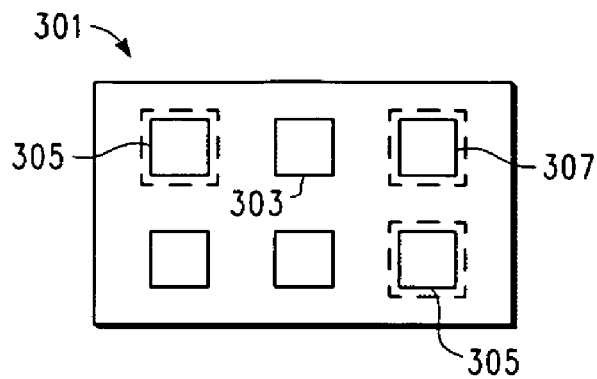
FIG. 10 is an illustration of an initial tiling data set with marker layers.

As shown in FIG. 10, an initial data set 301 is provided which defines an initial set of trench CMP tiles 303. As indicated by the dashed lines, first 305 and second 307 subsets of the trench CMP tiles are selected for use as first and second sets of epitaxial tiles. The first set of epitaxial tiles 305 are defined in the semiconductor substrate using the methodology depicted in FIGS. 1-5, while the second set of epitaxial tiles 307 are defined in the SOI layer in the step of the methodology depicted in FIG. 5. The selection may be performed using "marker layers" in the tiled database.

Figure 11:
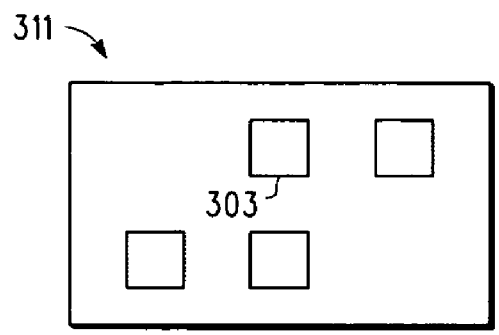
FIG. 11 is an illustration of an initial STI mask set.
Figure 12:
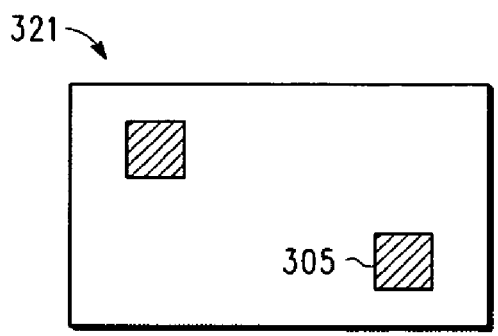
FIG. 12 is an illustration of a first initial epitaxial mask set.
Figure 13:
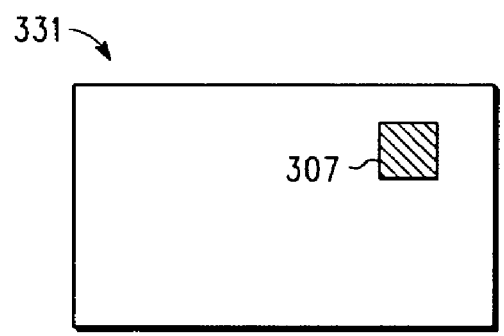
FIG. 13 is an illustration of a second initial epitaxial mask set.

As indicated in FIG. 11, the first set of epitaxial tiles 305 thus do not show up in the initial trench CMP mask set 311, since they are still field oxide at this point in the process (see FIG. 4 of the foregoing process), while the trench CMP tiles are SOI. The second set of epitaxial tiles 307 do show up in the initial trench CMP mask set 311, since they are formed in the SOI layer and are used for both processes. The first and second sets of epitaxial tiles 305 show up in the first 321 and second 331 epitaxy mask sets as indicated in FIGS. 12 and 13, respectively. Although the first 321 and second 331 epitaxy mask sets are depicted as distinct mask sets here for purposes of illustration, it is to be understood that, in the preferred embodiment, the first 321 and second 331 epitaxy mask sets are combined into a single epitaxy mask set.

Figure 14:
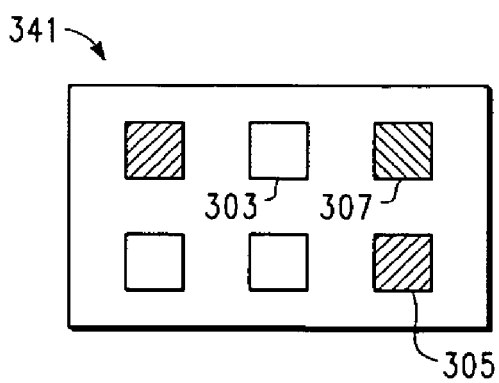
FIG. 14 is an illustration (top view) of a semiconductor device as it would appear if processed with the mask sets of FIGS. 11-13.

Initial mask sets 311, 321 and 331 are formed by the use of proper Boolean operations on the tile data and the marker data to exclude data set features from the initial trench CMP mask set 311 and to include those features on the first epitaxial mask set 321, as well as to assign a subset of the data set features to both the initial trench CMP mask set 311 and the second epitaxial mask set 331. FIG. 14 depicts a top view of a semiconductor device (corresponding to the stage in the process depicted in FIG. 8) as it would appear if processed with initial mask sets 311, 321 and 331.

Upon completion of the first phase of the process, the tiles for the first and second epitaxy mask sets 321 and 331 have been derived from the first trench CMP mask set 311, and hence may or may not be optimized for epitaxy. Similarly, the first trench CMP mask set 311 is typically no longer optimized for trench CMP, since a subset of the trench CMP tiles 303 has been removed from the first trench CMP mask set 311. This issue is addressed in the subsequent optimization phase.

Figure 15:
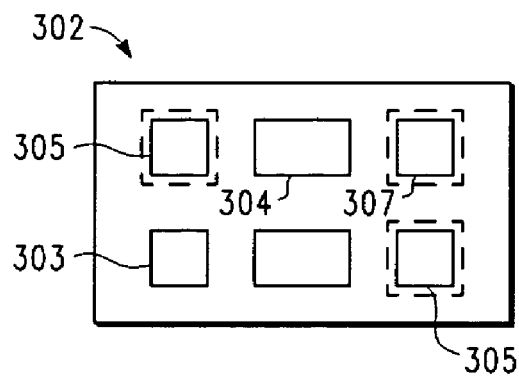
FIG. 15 is an illustration of a tiling data set with marker layers which has been re-optimized in accordance with the teachings herein.
Figure 16:
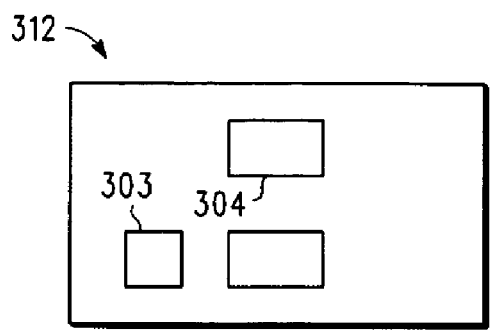
FIG. 16 is an illustration of an STI mask set which has been re-optimized in accordance with the teachings herein.
Figure 17:
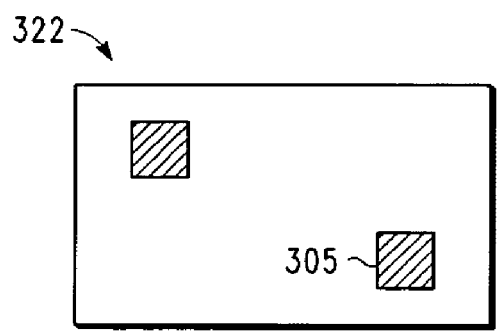
FIG. 17 is an illustration of a first epitaxial mask set which has been re-optimized in accordance with the teachings herein.
Figure 18:
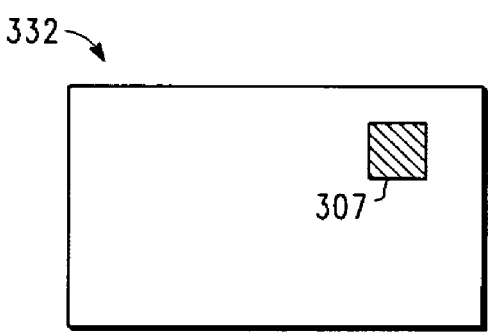
FIG. 18 is an illustration of a second epitaxial mask set which has been re-optimized in accordance with the teachings herein.
Figure 19:
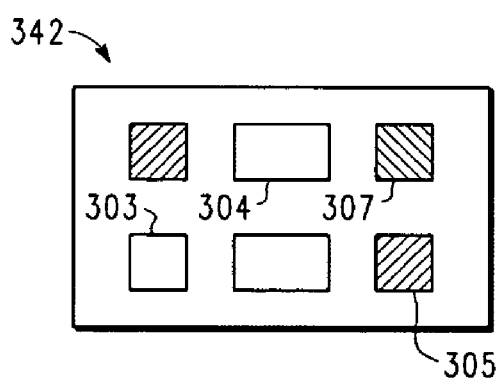
FIG. 19 is an illustration (top view) of a semiconductor device processed with the mask sets of FIGS. 16-18.

Referring now to FIG. 15, the trench CMP tiling data 302 is subsequently reconfigured or re-optimized by changing the dimensions of those trench CMP tiles 304 which are adjacent to the first 305 and/or second 307 sets of epitaxial tiles so as to compensate for the tiles removed from the first trench CMP mask set 311. The resulting re-optimized trench CMP mask set 312 and the epitaxy mask sets 322 and 332 (the later of which may or may not have been reconfigured or re-optimized) are shown in FIGS. 16, 17 and 18, respectively, as created through application of the correct set of Boolean operations on the tile and marker data. FIG. 19 shows the resultant surface of the wafer (corresponding to the stage in the process depicted in FIG. 8) following processing, indicating the location of both the trench CPM tiles 303, 304 and the first 305 and second 307 sets of epitaxial tiles.

The particular embodiment of the process depicted in FIGS. 10-19 illustrates the re-optimization or reconfiguration of only the first trench CMP mask set 311. However, it will be appreciated that, in some embodiments, all of the mask sets may be re-optimized or reconfigured. Moreover, while the particular embodiment depicted in FIGS. 10-19 is implemented as a two-step process, one skilled in the art will appreciate that algorithms having more than two steps may be derived from the principles disclosed herein. In such algorithms, the optimization step may be repeated until the tiling density reaches an acceptable level for both the active tiles and the epitaxial tiles. In some embodiments, the re-optimization or reconfiguration step may also involve changes in the orientation, dimensions and/or shape of tiles. One such embodiment is described below.

Figure 20:
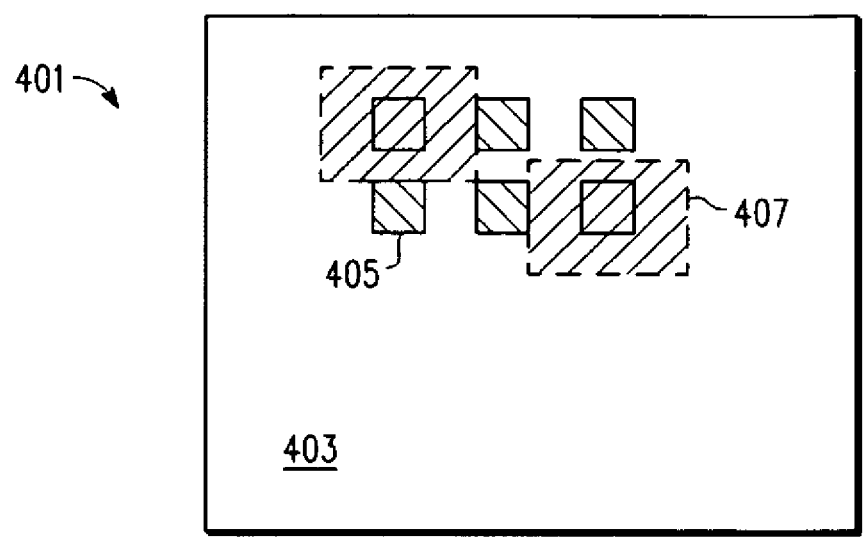
FIG. 20 illustrates the merging of tiles which can occur during epitaxy.

In designing a tiling scheme for epitaxial growth on a (110) bulk surface, lateral overgrowth is observed to happen at a faster rate than vertical growth. Moreover, the rate of overgrowth varies with direction, such that growth is preferred along certain crystallographic orientations. This phenomenon is depicted in FIG. 20. The structure 401 depicted therein comprises an SOI surface 403 upon which are disposed a plurality of STI CMP tiles 405 and a plurality of bulk epitaxial tiles 407. The dashed lines indicate the perimeter of the epitaxial tiles 407 after epitaxy. Depending on their proximity, it is thus possible for two epitaxial tiles 407 to merge during epitaxy, which can cause problems for the subsequent CMP.

Figure 21:
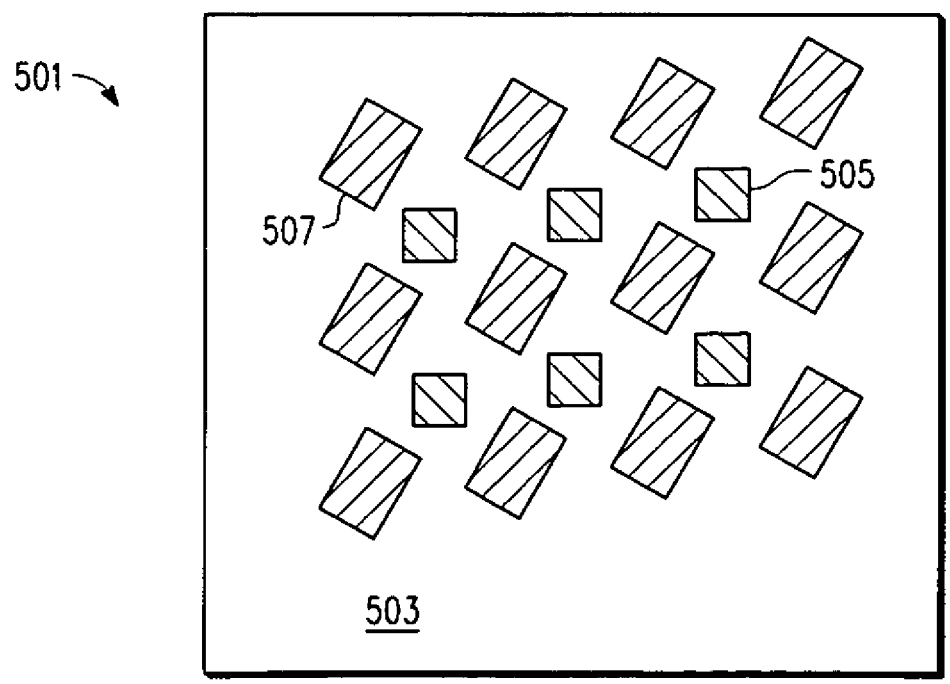
FIG. 21 illustrates a tiling strategy in which non-epitaxial tiles have been placed between epitaxial tiles to allow more room for overgrowth, and in which the orientation of the epitaxial tiles has been adjusted to effectively increase the distance between the epitaxial tiles in the direction of fastest growth.

One possible solution to this problem is illustrated in FIG. 21. The structure 501 depicted therein comprises an SOI surface 503 upon which are disposed a plurality of STI CMP tiles 505 and a plurality of bulk epitaxial tiles 507. However, in this embodiment, non-epitaxial tiles (in particular, the STI CMP tiles 505) have been placed between the epitaxial tiles 507, thereby allowing more room for overgrowth. Moreover, the orientation of the epitaxial tiles 507 has been adjusted to effectively increase the distance between the epitaxial tiles 507 in the direction of fastest growth. It will thus be appreciated that, by adjusting the orientation of the epitaxial tiles, the amount of silicon overburden may be tuned. Moreover, overgrowth issues and their impact on silicon CMP may be controlled by designing preferential facets into the overburden, as by orienting the epitaxial tiles along specific crystallographic orientations.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for making a semiconductor device, comprising:
    creating a first data set which defines a set of tiles for a trench chemical mechanical polishing (CMP) process;
    deriving a first trench CMP mask set and at least one epitaxial growth mask set from the first data set, wherein the at least one epitaxial growth mask set defines epitaxial growth tiles grown on first and second distinct semiconductor surfaces;
    reconfiguring the first trench CMP mask set to account for the at least one epitaxial growth mask set, thereby deriving a reconfigured trench CMP mask set which defines a set of reconfigured trench CMP tiles; and
    using the reconfigured trench CMP mask set to make a semiconductor device.

2. The method of claim 1, wherein the semiconductor device contains an SOI layer, a semiconductor substrate, and a dielectric layer disposed between the SOI layer and the substrate.

3. The method of claim 2, wherein the at least one epitaxial growth mask set includes first and second epitaxial growth mask sets, wherein the first epitaxial growth mask set corresponds to tiles grown on the semiconductor substrate, and wherein the second epitaxial growth mask set corresponds to tiles grown on the SOI layer.

4. The method of claim 3, wherein the first data set defines first and second subsets of tiles, and wherein the first and second epitaxial growth mask sets are derived from the first data set by removing the first and second subsets of tiles therefrom and incorporating them into the first and second epitaxial growth mask sets, respectively.

5. The method of claim 1, wherein the step of creating the first data set includes the step of optimizing the density of the first set of tiles defined therein for trench CMP.

6. The method of claim 4, wherein the step of reconfiguring the first trench CMP mask set to account for the first and second epitaxial growth mask sets includes the step of re-optimizing the feature density of the first trench CMP mask set to compensate for the removal of the first and second subsets of tiles therefrom.

7. The method of claim 6, wherein the feature density of the first trench CMP mask set is re-optimized by changing the dimensions of some of the tiles defined therein.

8. The method of claim 6, wherein the feature density of the first trench CMP mask set is re-optimized by changing the dimensions of some of the tiles defined therein which are adjacent to tiles belonging to at least one of the first and second subsets of tiles.

9. The method of claim 1, wherein the first data set defines first and second subsets of tiles, and wherein the density of the first and second subsets of tiles are selected to optimize an epitaxial growth process.

10. The method of claim 1, wherein the first data set defines first and second subsets of tiles, and wherein, after the first and second subsets of tiles are selected, the orientation of some of the tiles within at least one of the first and second subsets is modified.

11. The method of claim 1, wherein the first data set defines first and second subsets of tiles, and wherein, after the first and second subsets of files are selected, the orientation of some of the tiles within the first and second subsets of tiles are modified, thereby defining a second epitaxial growth mask set.

12. The method of claim 11, wherein some of the tiles in the second epitaxial growth mask set are aligned along a first major axis.

13. The method of claim 12, wherein the first major axis is not parallel to a major axis of the trench CMP tiles in the second trench CMP mask set.

14. The method of claim 1, further comprising:
    using the at least one epitaxial growth mask set and the reconfigured trench CMP mask set to fabricate a semiconductor device.

15. The method of claim 1, wherein the semiconductor device is a CMOS device.

16. The method of claim 1, wherein the reconfigured trench CMP mask set is used to fabricate a first plurality of trenches in the semiconductor device, after which the at least one epitaxial growth mask set is used to grow epitaxial features in the semiconductor device.

17. The method of claim 16, wherein the first plurality of trenches are backfilled with an oxide.

18. The method of claim 16, wherein the step of using the at least one epitaxial growth mask set to grow epitaxial features on the semiconductor structure includes using the at least one epitaxial growth mask set to define a second plurality of trenches, and wherein each of the second plurality of trenches is disposed within one of the first plurality of trenches and exposes a portion of the substrate.

19. The method of claim 18, further comprising the step of epitaxially growing the exposed portion of the substrate.

20. A method for making a semiconductor device, comprising:
    creating a first data set which defines a first set of tiles whose density is optimized for a trench chemical mechanical polishing (CMP) process, wherein the first data set also defines first and second subsets of tiles;
    deriving a first trench CMP mask set and at least one epitaxial growth mask set from the first data set, wherein the at least one epitaxial growth mask set is derived from the first data set by removing the first and second subsets of tiles and by incorporating the first and second subsets of tiles into the at least one epitaxial growth mask set; and
    re-optimizing the first trench CMP mask by adjusting the dimensions of some of the tiles defined therein.

* * * * *